(12) United States Patent
Inoko (10) Patent No.: US 9,829,777 B2
(45) Date of Patent: Nov. 28, 2017

(54) LIGHT SOURCE UNIT AND PROJECTION TYPE DISPLAY APPARATUS

(71) Applicant: CANON KABUSHIKI KAISHA, Tokyo (JP)

(72) Inventor: Kazuhiro Inoko, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 188 days.

(21) Appl. No.: 14/520,478

(22) Filed: Oct. 22, 2014

(65) Prior Publication Data

US 2015/0109583 A1    Apr. 23, 2015

(30) Foreign Application Priority Data

Oct. 23, 2013 (JP) ................. 2013-219726

(51) Int. Cl.

| | |
|---|---|
| F21V 1/00 | (2006.01) |
| F21V 11/00 | (2015.01) |
| G03B 21/20 | (2006.01) |
| F21V 7/00 | (2006.01) |
| F21V 9/16 | (2006.01) |
| F21V 5/04 | (2006.01) |
| H04N 9/31 | (2006.01) |
| G03B 33/00 | (2006.01) |

(52) U.S. Cl.
CPC ............ *G03B 21/2013* (2013.01); *F21V 5/04* (2013.01); *F21V 7/0083* (2013.01); *F21V 9/16* (2013.01); *G03B 21/204* (2013.01); *G03B 33/00* (2013.01); *H04N 9/3158* (2013.01); *H04N 9/3161* (2013.01); *H04N 9/3173* (2013.01)

(58) Field of Classification Search
CPC .................................................. G03B 21/2013
USPC .................................................. 362/236–237
See application file for complete search history.

(56) References Cited

U.S. PATENT DOCUMENTS

| | | | |
|---|---|---|---|
| 8,721,087 B2 | 5/2014 | Kurosaki | |
| 8,882,279 B2 | 11/2014 | Huang | |
| 9,348,206 B2* | 5/2016 | Matsubara | G03B 21/2073 |
| 2003/0214633 A1 | 11/2003 | Roddy et al. | |
| 2012/0127435 A1* | 5/2012 | Kitano | G03B 21/204 |
| | | | 353/20 |
| 2012/0133904 A1 | 5/2012 | Akiyama | |
| 2012/0147333 A1* | 6/2012 | Jorgensen | G03B 33/06 |
| | | | 353/31 |
| 2012/0182712 A1 | 7/2012 | Huang | |

(Continued)

FOREIGN PATENT DOCUMENTS

| | | |
|---|---|---|
| CN | 1459661 A | 12/2003 |
| EP | 2506076 A1 | 10/2012 |

(Continued)

OTHER PUBLICATIONS

Office Action issued in Taiwanese Application No. 103136300, dated Jun. 23, 2015. English translation provided.

(Continued)

*Primary Examiner* — Peggy Neils
*Assistant Examiner* — William N Harris
(74) *Attorney, Agent, or Firm* — Rossi, Kimms & McDowell LLP (57) ABSTRACT

A light source unit includes a green light source, a red light source, a blue light source, and a condenser lens system that condenses green light and red light at positions different from each other.

15 Claims, 11 Drawing Sheets (56) References Cited

U.S. PATENT DOCUMENTS

| | | | | |
|---|---|---|---|---|
| 2012/0218529 A1* | 8/2012 | Huang | ............... | G03B 21/2013 353/102 |
| 2012/0249972 A1* | 10/2012 | Kurosaki | ........... | G03B 21/2013 353/31 |
| 2014/0253881 A1* | 9/2014 | Osaka | ................ | G03B 21/2013 353/20 |
| 2015/0002824 A1* | 1/2015 | Kasugai | .................... | F21K 9/56 353/31 |

FOREIGN PATENT DOCUMENTS

| | | | |
|---|---|---|---|
| JP | 2012142222 | A | 7/2012 |
| JP | 2013029622 | A | 2/2013 |
| TW | 200617573 | A | 6/2006 |
| TW | 201224632 | A | 6/2012 |
| TW | 201235703 | A | 9/2012 |
| TW | 201245845 | A | 11/2012 |

OTHER PUBLICATIONS

Extended European Search Report issued in EP14003577.5, dated Mar. 13, 2015.

\* cited by examiner

FIG. 1A

ILLUMINATION OPTICAL SYSTEM

ILLUMINATION OPTICAL SYSTEM

LIGHT SOURCE UNIT AND PROJECTION TYPE DISPLAY APPARATUS

BACKGROUND OF THE INVENTION

Field of the Invention

The present invention relates to a light source unit and a projection type display apparatus having the same, such as a liquid crystal projector.

Description of the Related Art

Japanese Patent Laid-open No. ("JP") 2012-142222 discloses a white light source unit configured to generate fluorescence by a fluorescent layer in response to light of a solid light source as excitation light, to use the fluorescent light as green light flux, and to use the light fluxes of the solid light sources for red and blue light fluxes so that optical paths are synthesized with one another by a dichroic mirror. In any optical paths, light fluxes emitted from a plurality of light sources are once condensed through a lens system, and then the red and blue light fluxes are put through a diffuser for speckle removals and the green light flux is put through the fluorescent layer and collimated by the lens system again.

Each light source in JP 2012-142222 requires a high-NA lens system so as to efficiently take in diffused light in any optical paths, which leads to an increase in size. Thus, this prior art cannot be easily applied to a projector that requires high brightness and a small and light-weight body.

SUMMARY OF THE INVENTION

The present invention provides a small and highly efficient light source unit and a projection type display apparatus having the same.

A light source unit according to the present invention includes a first light source configured to emit a first light flux, a second light source configured to emit a second light flux, and a condenser optical system configured to condense the first light flux emitted from the first light source to a first position and to condense the second light flux emitted from the second light source to a second position different from the first position. The condenser optical system is arranged such that the first light flux and the second light flux are incident on the condenser optical system at angles different from each other.

DESCRIPTION OF THE EMBODIMENTS

Figure 11:
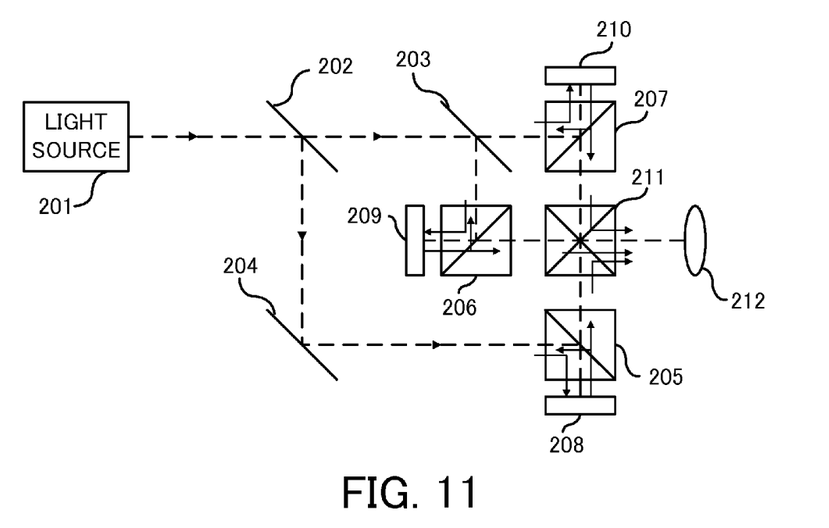
FIG. 11 is an optical path diagram of a projection type display apparatus according to each of Embodiments 1 and 2, and 3 of the present invention.

FIG. 11 is an optical path diagram of a liquid crystal projector according to each embodiment of the present invention. The liquid crystal projector is an exemplary projection type display apparatus (image display apparatus). The liquid crystal projector according to this embodiment includes a light source 201, dichroic mirrors 202 and 203, a mirror 204, polarization beam splitters 205, 206, and 207, liquid crystal panels 208, 209, and 210, a X prism (cross dichroic prism) 211, and a projection lens (projection optical system) 212.

The light source 201 includes a light source portion that outputs a white light, and an illumination optical system (not illustrated) that illuminates a light modulator with light from the light source portion. A light source unit in each of Embodiments 1 to 3 described later is applied as this light source portion. The illumination optical system may include, if necessary, an integrator, a UV-IR (ultraviolet-infrared light) cut filter, and a polarization converter that aligns a polarization direction.

The white light from the light source 201 is incident on the dichroic mirror 202. The dichroic mirror 202 reflects a green (hereinafter, referred to as "G") component light and transmits a red (hereinafter, referred to as "R") component light and a blue (hereinafter, referred to as "B") component light. The G, R, and B component lights have wavelength ranges different from each other. Thus, the G component light is separated from the R and B component lights.

Then, the R and B component lights are incident on the dichroic mirror 203. The dichroic mirror 203 reflects the R component light and transmits the B component light. Thus, the R component light is separated from the B component light. The optical path of the G component light is bent by the mirror 204.

In this manner, the dichroic mirrors 202 and 203 each serves as a color separating unit that disperses the white light into a plurality of color components.

The separated G, R, and B component lights are incident on the respective polarization beam splitters 205, 206, and 207. The polarization beam splitters 205, 206, and 207 each serves as a polarization separating unit provided with a polarization separating plane that transmits a first polarization light and reflects a second polarization light. The first polarization light and the second polarization light have polarization directions orthogonal to each other: for example, the first polarization light is a P polarization light and the second polarization light is an S polarization.

The G, R, and B component lights reflected at the polarization beam splitters 205, 206, and 207 are respectively supplied to the reflective liquid crystal panels 208, 209, and 210. The liquid crystal panels 208, 209, and 210 each serve as the light modulator that modulates a corresponding component light in response to an image signal output from an image signal output unit 109 described later and reflects them.

The component lights of G, R, and B that are reflected by the liquid crystal panels 208, 209, and 210 and have their polarization directions converted return to the respective polarization beam splitters 205, 206, and 207. In this manner, the G, R, and B component lights each are separated into a component light that passes through a corresponding one of the polarization beam splitters 205, 206, and 207 and is incident on the X prism 211, and a component light that is reflected by a corresponding one of the polarization beam splitters 205, 206, and 207 and returns toward the light source.

The X prism 211 serves as a synthesizing unit that synthesizes the component lights modulated and having passed through the polarization separating units. The X prism 211 synthesizes the G, R, and B component lights and supplies them as a synthesized light to the projection lens 212. The projection lens 212 has a zoom function and projects the supplied synthesized light onto a projection surface such as a screen at an optional magnification to display an image. This embodiment describes the example in which three liquid crystal panels are employed, but is not limited thereto. This embodiment may be applied to a system in which color reproduction is performed with one liquid crystal panel by time division or a system including a digital mirror device.

Next follows a description of the light source unit applicable as the light source portion of the light source 201.

The light source unit according to this embodiment includes at least two light sources; for example, a first light source configured to emit a first light flux and a second light source configured to emit a second light flux. In this case, the first light source may be a green light source that emits green light, and the second light source may be a red light source that emits red light or a blue light source that emits blue light. Alternatively, the first light source may be a red light source that emits red light, and the second light source may be a blue light source that emits blue light. The first and second light fluxes may have equal or different wavelength bands.

The light source unit further includes a condenser optical system, a first characteristic changing element, a second characteristic changing element, a first light guide element, and a second light guide element.

The condenser optical system condenses the first light flux emitted from the first light source to a first position and condenses the second light flux emitted from the second light source to a second position different from the first position. Such formation of condensation spots at different positions by the single condenser optical system enables downsizing. The condenser optical system includes, for example, two plano-convex lenses and two meniscus lenses.

When the light sources are constituted by an array of the first light sources and an array of the second light sources, the array of the first light sources and the array of the second light sources may be arranged at angles different from each other relative to an optical axis of the condenser optical system. This arrangement facilitates condensation to two different condensation positions. Another configuration is possible in which the first light flux is put through the first light guide element and the second light flux is made incident on the condenser optical system not through the second light guide element.

The first characteristic changing element is arranged at the first position, and changes at least one of a wavelength band and an optical path of the first light flux and reflects the first light flux. The second characteristic changing element is arranged at the second position, and changes at least one of a wavelength band and an optical path of the second light flux and reflects the second light flux. At least one of the first characteristic changing element and the second characteristic changing element may include a fluorescent layer that fluoresces in response to incident light as excitation light. For example, the first characteristic changing element includes a fluorescent layer for green light and the second characteristic changing element includes a fluorescent layer for red light. When optical paths of incident and emitted lights (inward and outward optical paths) are the same, at least wavelength characteristics of the emitted light and the incident light are changed through the characteristic changing elements. Alternatively, at least one of the first characteristic changing element and the second characteristic changing element may deflect the incident light and change the angle characteristic thereof through, for example, a diffusion reflector. In this manner, a light guide element that transmits the incident light and reflects the emitted light by employing different wavelength characteristics or through deflection of the incident light can be arranged in between the light source and the condenser optical system, which enables downsizing.

The incident light may be incident on the condenser optical system through or not through the light guide element.

The first light guide element guides a light flux through the condenser optical system from the first characteristic changing element (to the illumination optical system, for example). The second light guide element is arranged at a position different from that of the first light guide element and guides a light flux through the condenser optical system from the second characteristic changing element (to the illumination optical system, for example). The first and second light guide elements may be, but not limited to, dichroic mirrors having spectral reflection characteristics different from each other, and may be polarization beam splitters (PBS), for example. Reflecting surfaces of the dichroic mirrors may be arranged at angles different from each other. This arrangement allows lights from different condensation positions to be treated. The dichroic mirror as the second light guide element may have its reflection band variable with an incident angle of the second light flux to the second light guide element. The first and second light guide elements may superimpose light fluxes. The first and second light guide elements may be arranged at a pupil position of the condenser optical system when a condensation position of the condenser optical system is set to an object position.

Of course, the light source unit according to this embodiment further includes a third light source, a third characteristic changing element, and a third light guide element. The third light source may be configured to emit a third light flux having a wavelength different from those of the first light flux and the second light flux. The third characteristic changing element may be arranged at a position different from the first position and the second position and configured to change at least one of a wavelength band and an optical path of the third light flux and to reflect the third light flux. The third light guide element may be arranged at a position different from those of the first light guide element and the second light guide element and configured to guide a light flux passing through the condenser optical system from the third characteristic changing element.

Embodiment 1

Figure 1A:
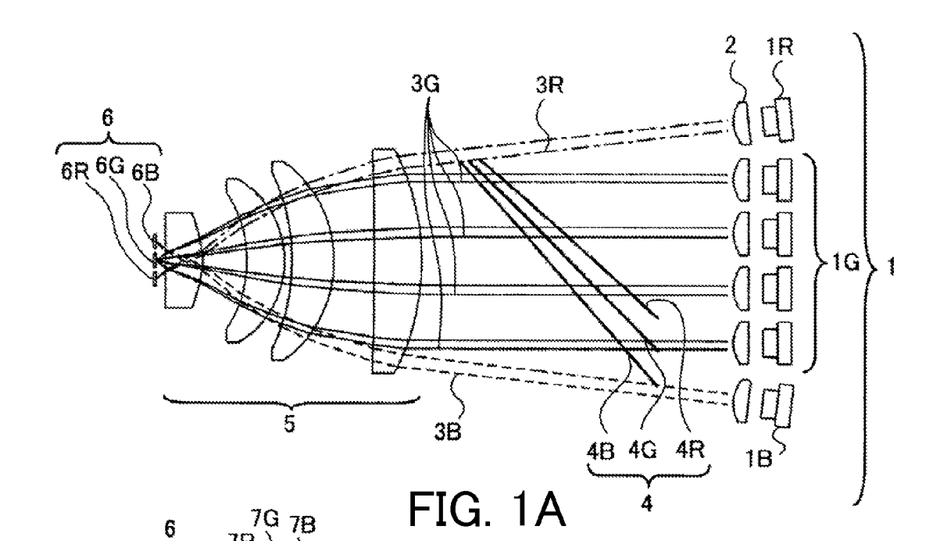
FIGS. 1A and 1B are optical path diagrams of a light source unit according to Embodiment 1 of the present invention.
Figure 1B:
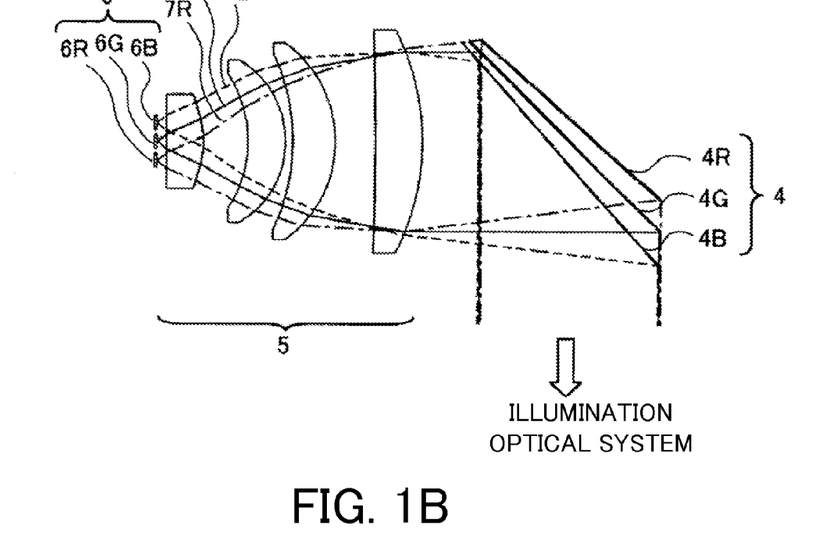

FIGS. 1A and 1B are optical path diagrams of a light source unit according to Embodiment 1. The light source unit includes a solid light source 1, a collimator lens 2, a dichroic mirror 4, a condenser lens system 5, and a diffusion reflector 6. A light flux emitted from the light source 1 is condensed at the diffusion reflector 6 through the condenser lens system 5, diffusively reflected by the diffusion reflector 6, formed into a parallel light through the condenser lens system 5, reflected by the dichroic mirror 4, and guided to the illumination optical system. In this embodiment, the single condenser lens system (condenser optical system) 5 forms more than two condensation spots, which reduces size and weight. However, the condenser optical system according to the present invention may include an optical element other than a lens, such as a mirror. FIG. 1A illustrates an optical path of a light flux from the light source 1 to the diffusion reflector 6, and FIG. 1B illustrates an optical path of a light flux after reflected by the diffusion reflector 6. Letters R, G, and B following numerical references each represent the color of a light flux to be eventually emitted from the light source unit through a corresponding element, and respectively correspond to red, green, and blue.

Figure 2A:
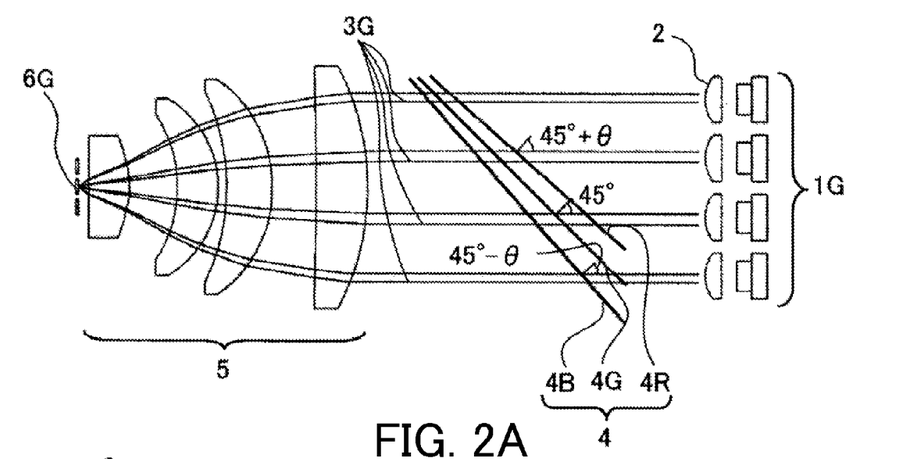
FIGS. 2A and 2B are G optical path diagrams of the light source unit illustrated in FIGS. 1A and 1B.

FIG. 2A is an optical path diagram of a source light emitted from a green light source 1G to a diffusion reflector 6G. The green light source 1G is a blue laser light source having a central wavelength of 448 nm. The collimator lens 2 is arranged right after the green light source 1G and forms a laser-emitted light flux into a parallel light. The green light source 1G and the collimator lens 2 are arrayed in pairs across the sheet of FIG. 2A and in a direction perpendicular to the sheet (not illustrated) with a light emission direction of each pair aligned in parallel to the optical axis of the condenser lens system 5. The light flux emitted from the green light source 1G is formed into the parallel light through the collimator lens 2 and is incident as a parallel light flux 3G on the dichroic mirror 4.

The dichroic mirrors 4 of three kinds of 4R, 4G, and 4B are arranged in order from the light source. The dichroic mirror 4G is arranged with its surface normal tilted at 45° to the parallel light flux 3G (the optical axis of the condenser lens system). The dichroic mirrors 4R and 4B are arranged at θ (degree) to the dichroic mirror 4G with their surface normal angled at 45°+θ and 45°−θ respectively.

Figure 5A:
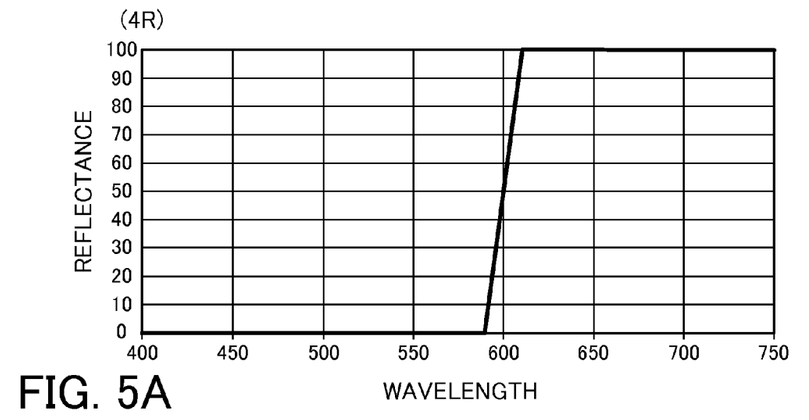
FIGS. 5A, 5B and 5C are graphs illustrating characteristics of a dichroic mirror used in the light source unit illustrated in FIGS. 1A and 1B.
Figure 5B:
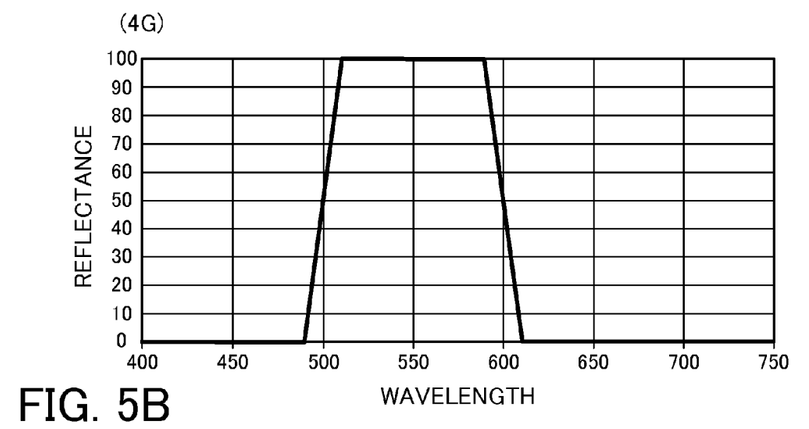
Figure 5C:
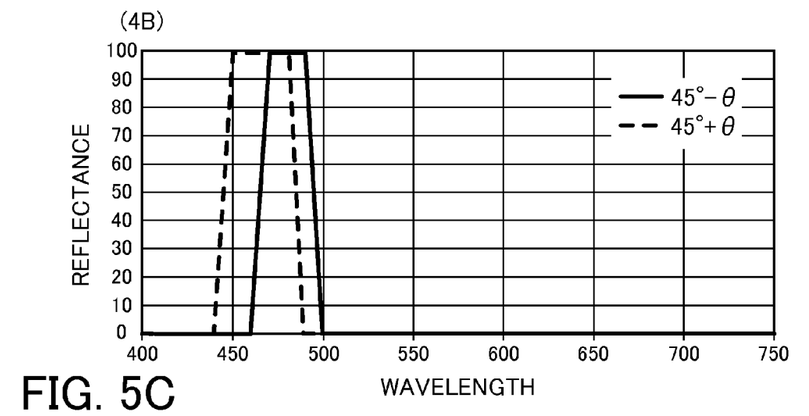

FIGS. 5A to 5C respectively illustrate spectral reflection characteristics of the dichroic mirrors 4R, 4G, and 4B.

The dichroic mirrors 4R and 4G have no reflection characteristics for a blue band and are designed such that their reflection characteristics do not significantly vary with incident angles. Thus, the dichroic mirrors 4R and 4G transmit the parallel light flux 3G of a wavelength of 448 nm without reflecting it.

On the other hand, the dichroic mirror 4B is designed such that a reflection band shift increases with an incident angle. The reflection band of a dichroic mirror typically shifts to a shorter wavelength side with its band extending with a larger incident angle. The size of the shift is adjustable to some extent depending on a film material and a film structure. The parallel light flux 3G is incident on the dichroic mirror 4B at an angle of 45°−θ. As illustrated in FIG. 5C, for the incident angle of 45°−θ, the wavelength of 448 nm resides outside the reflection band, and the parallel light flux 3G passes through the dichroic mirror 4B without being reflected.

Consequently, the parallel light flux 3G passes through the dichroic mirrors 4R, 4G, and 4B without being reflected and is incident on the condenser lens system 5.

The condenser lens system 5 condenses a plurality of incident parallel light fluxes 3G to a point. The diffusion reflector 6G is arranged at this condensation point. The diffusion reflector 6G is a fluorescent layer that fluoresces in green in response to light of 448 nm as excitation light, and diffusively reflects the light fluxes 3G thus condensed, through a conversion into diffusively reflected light 7G having a spectrum in a green band.

Figure 6A:
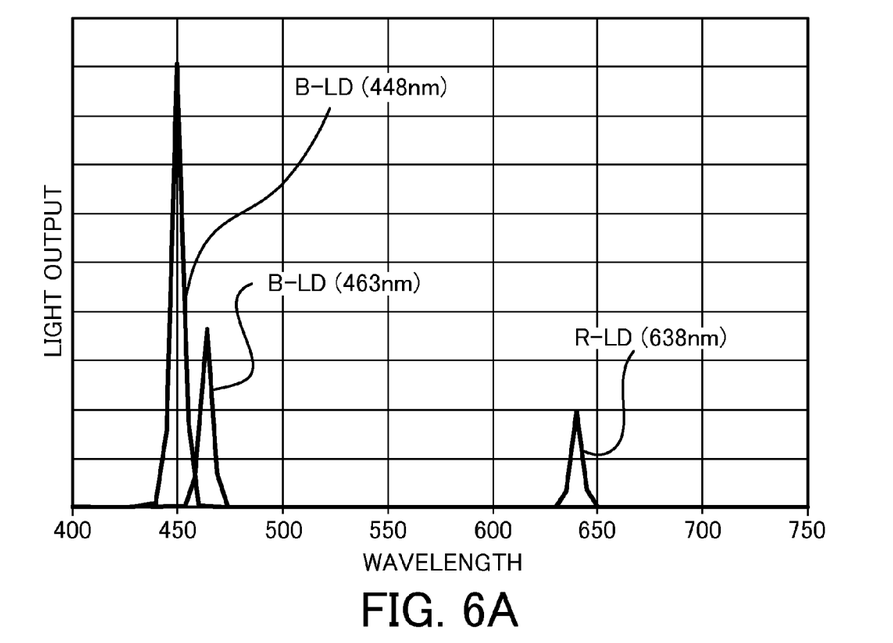
FIGS. 6A and 6B are graphs illustrating optical spectrums of the light source unit illustrated in FIGS. 1A and 1B.
Figure 6B:
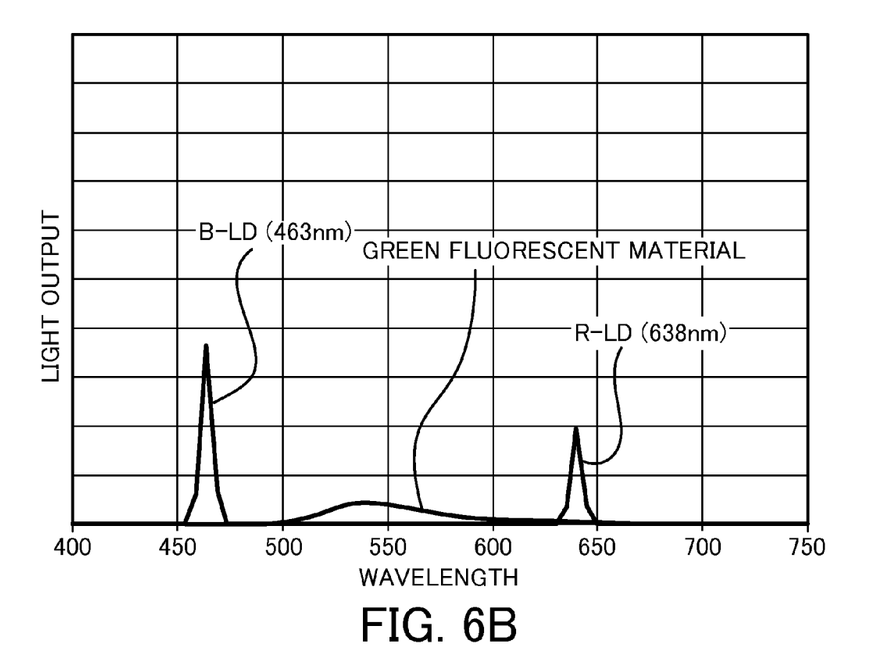

FIG. 6A illustrates an optical spectrum of light fluxes emitted from light sources 1 to the diffusion reflector 6, and FIG. 6B illustrates an optical spectrum of light fluxes after reflected by the diffusion reflector 6 until emitted from the light source unit. In FIG. 6A, a laser spectrum centering on 448 nm corresponds to an emission spectrum of the green light source 1G, and this spectrum is converted into a spectrum of a fluorescent material for green light in FIG. 6B that illustrates a spectrum after the diffusive reflection.

Figure 2B:
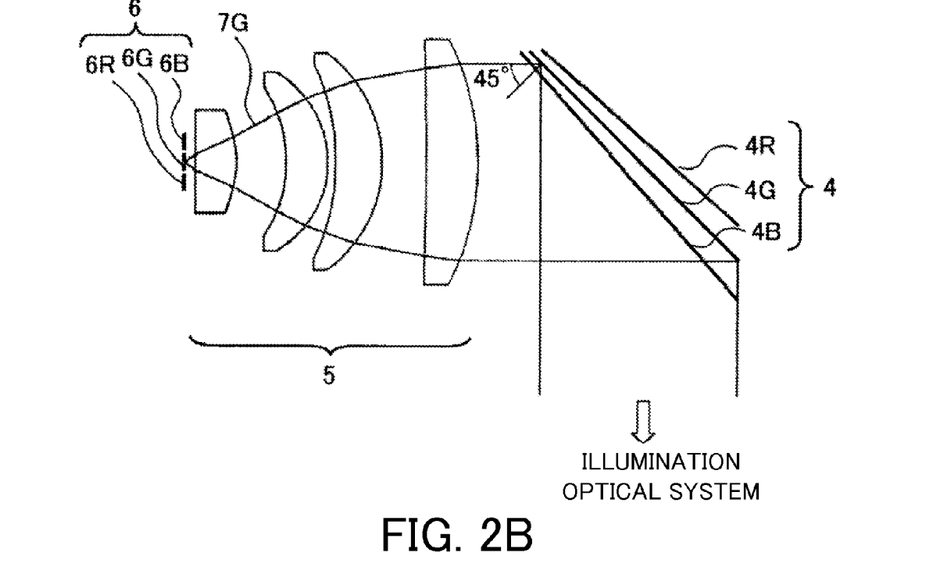

FIG. 2B is an optical path diagram of the diffusively reflected light 7G after diffusively reflected by the diffusion reflector 6G until emitted from the light source unit. The diffusively reflected light 7G passes through the condenser lens system 5 again and formed into a parallel light before reaching at the dichroic mirror 4 again. As illustrated in FIGS. 5A to 5C, the dichroic mirror 4B has no reflection characteristic for the green band, and thus transmits the parallel light without reflecting it. The dichroic mirror 4G has a reflection characteristic for the green band, and thus reflects the diffusively reflected light 7G and guides it to the illumination optical system.

Figure 3A:
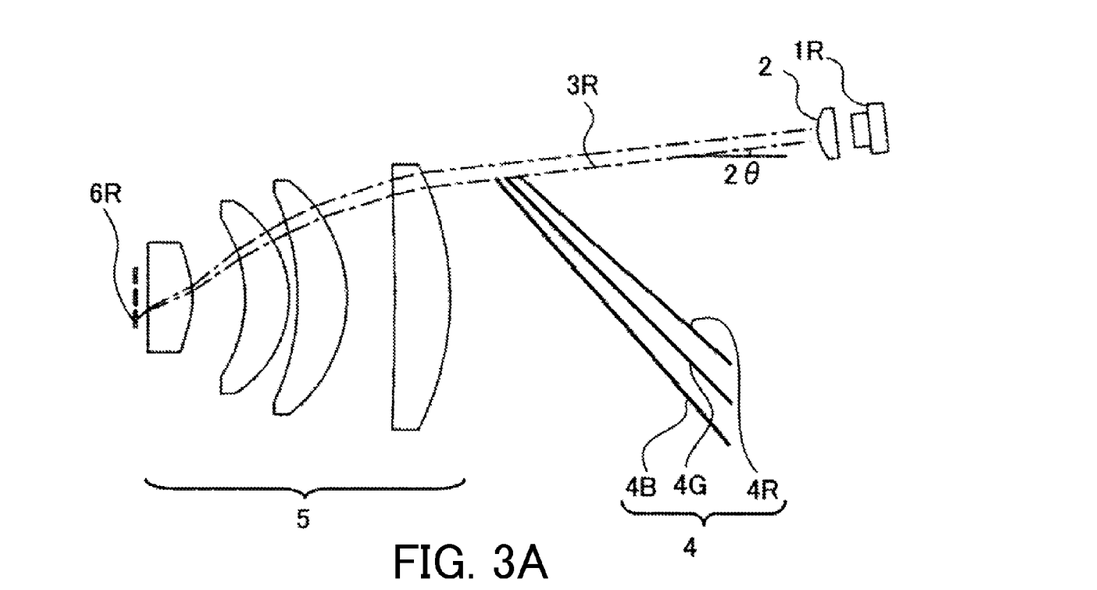
FIGS. 3A and 3B are R optical path diagrams of the light source unit illustrated in FIGS. 1A and 1B.

FIG. 3A is an optical path diagram of a source light emitted from a red light source 1R to a diffusion reflector 6R. The red light source 1R is a red laser light source of 638 nm. The collimator lens 2 is arranged right after the red light source 1R and forms a laser-emitted light flux into a parallel light. The red light source 1R and the collimator lens 2 are arrayed in pairs across the sheet of FIG. 3A and in a direction perpendicular to the sheet (not illustrated) with each pair tilted at 2θ to the optical axis of the condenser lens system 5.

The light flux emitted from the red light source 1R is formed into the parallel light as a parallel light flux 3R through the collimator lens 2. The dichroic mirror 4 is designed and arranged so as not to interfere with an optical path of the parallel light flux 3R, and thus the parallel light flux 3R is incident on the condenser lens system 5 without being affected by the dichroic mirror 4. The condenser lens system 5 condenses the incident parallel light flux 3R to a point. The parallel light flux 3R is tilted with respect to the optical axis of the condenser lens system 5, and thus is condensed to a point different from the condensation point of the parallel light fluxes 3G in FIGS. 2A and 2B. The diffusion reflector 6R is arranged at this condensation point of the parallel light flux 3R.

Figure 3B:
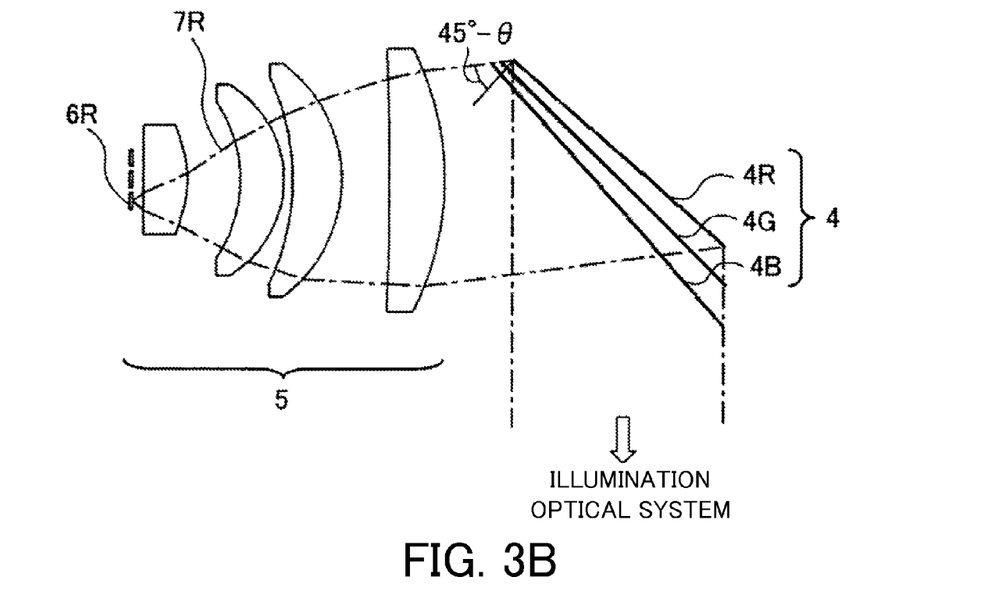

FIG. 3B is an optical path diagram of the parallel light flux 3R after diffusively reflected by the diffusion reflector 6R until emitted from the light source unit. The diffusion reflector 6R has a reflecting surface having a random diffusive shape and diffuses an obliquely incident parallel light flux 3R while changing a travelling direction thereof to a normal direction of the diffusion reflector 6R and guiding the parallel light flux 3R to the condenser lens system 5. Diffusively reflected light 7R passes through the condenser lens system 5 again and is formed into a parallel light before reaching at the dichroic mirror 4. The diffusively reflected light 7R is incident on the dichroic mirror 4 at an angle of 45°−θ. As illustrated in FIGS. 5A to 5C, the dichroic mirrors 4B and 4G have no reflection characteristics for a red band, and thus the parallel light passes through the dichroic mirrors 4B and 4G without being reflected. The dichroic mirror 4R has a reflection characteristic for the red band, and thus reflects the diffusively reflected light 7R and guides it to the illumination optical system.

Figure 4A:
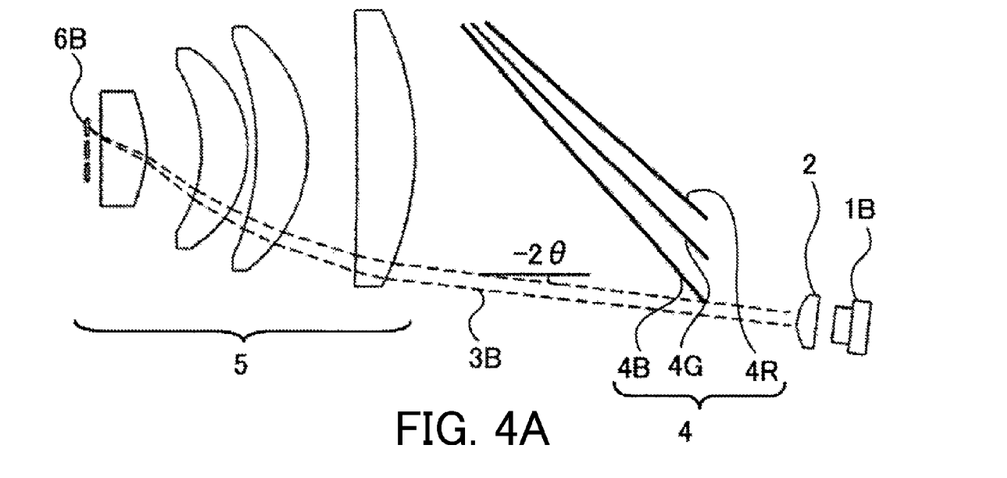
FIGS. 4A and 4B are B optical path diagrams of the light source unit illustrated in FIGS. 1A and 1B.

FIG. 4A is an optical path diagram of a source light emitted from a blue light source 1B to a diffusion reflector 6B. The blue light source 1B is a blue laser light source of 465 nm. The collimator lens 2 is arranged right after the blue light source 1B and forms a laser-emitted light flux into a parallel light. The blue light source 1B and the collimator lens 2 are arrayed in pairs in a direction perpendicular to the sheet of FIG. 4A (not illustrated) with each pair titled at $-2\theta$ to the optical axis of the condenser lens system 5.

The light flux emitted from the blue light source 1B is formed into the parallel light as a parallel light flux 3B through the collimator lens 2. The dichroic mirror 4 is designed so as not to interfere with an optical path of the parallel light flux 3B, and thus the parallel light flux 3B is incident on the condenser lens system 5 without being affected by the dichroic mirror 4. The condenser lens system 5 condenses the incident parallel light flux 3B to a point. The parallel light flux 3B is titled with respect to the optical axis of the condenser lens system 5 in a direction opposite that of the parallel light flux 3R, and thus is condensed to a point different from the condensation point of the parallel light flux 3G in FIGS. 2A and 2B and the condensation point of the parallel light flux 3R in FIGS. 3A and 3B. The diffusion reflector 6B is arranged at this condensation point of the parallel light flux 3B.

Figure 4B:
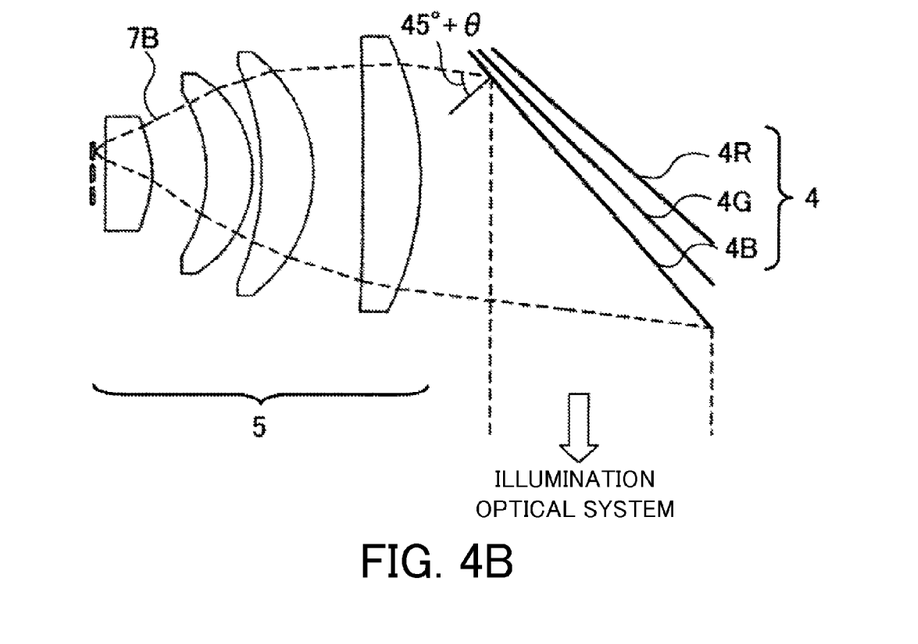

FIG. 4B is an optical path diagram of the parallel light flux 3B after diffusively reflected by the diffusion reflector 6B until emitted from the light source unit. The diffusion reflector 6B has a reflecting surface having a random diffuse shape and diffuses an obliquely incident parallel light flux 3B while changing a travelling direction thereof to a normal direction of the diffusion reflector 6B and guiding the parallel light flux 3B to the condenser lens system 5. Diffusively reflected light 7B passes through the condenser lens system 5 again and is formed into a parallel light before reaching at the dichroic mirror 4.

The diffusively reflected light 7B is incident on the dichroic mirror 4B at an angle of $45°+\theta$. As illustrated in FIGS. 5A to 5C, for the angle of $45°+\theta$, the reflection band of the dichroic mirror 4B shifts to a shorter wavelength side. Consequently, the dichroic mirror 4B reflects the diffusively reflected light 7B and guides it to the illumination optical system.

In this manner, the light source unit emits the optical spectrum illustrated in FIG. 6B.

Embodiment 2

Figure 8A:
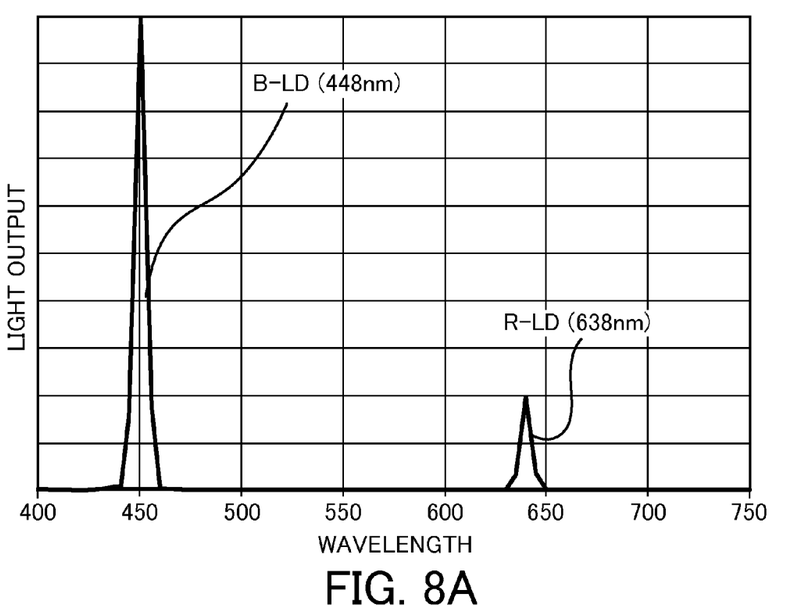
FIGS. 8A and 8B are graphs illustrating optical spectrums of the light source unit according to Embodiment 2 of the present invention.
Figure 8B:
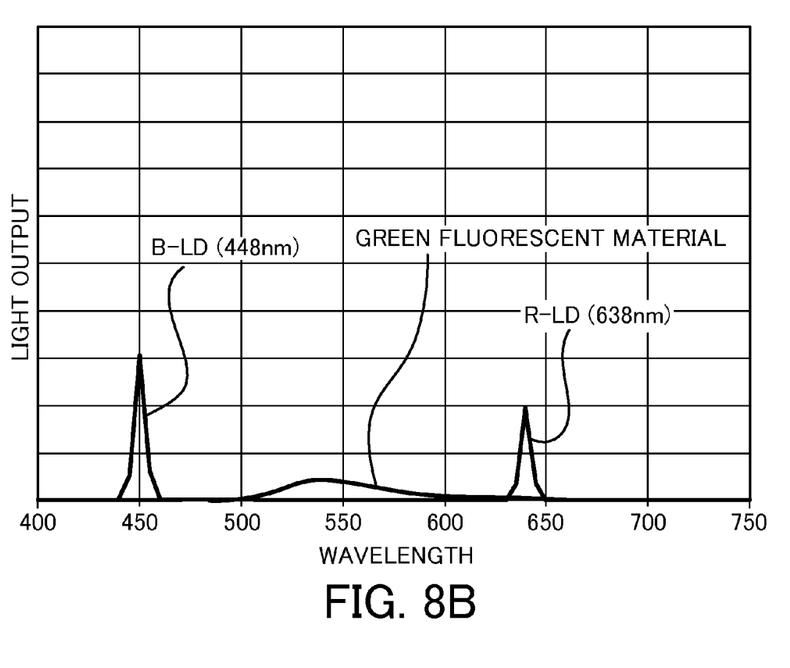

Although the configuration of an optical apparatus according to Embodiment 2 is the same as that of Embodiment 1, but differs therefrom in that an oscillation wavelength of the blue light source 1B is the same as that of the green light source 1G and a reflectance characteristic of the dichroic mirror 4B is different from that in Embodiment 1. FIGS. 8A and 8B illustrate optical spectrums according to Embodiment 2. Unlike FIGS. 6A and 6B, FIG. 8A illustrates no spectrum at 465 nm and an increased spectrum at 448 nm. The spectrum at 448 nm represents a total light output of the blue light source 1B and the green light source 1G.

In FIG. 8B, a light output constituting the spectrum at 448 nm and corresponding to the green light source 1G is converted into fluorescence in the green band. Comparison between FIG. 8B and FIG. 6B shows that a blue output wavelength in this embodiment resides closer to a shorter wavelength side.

Figure 7A:
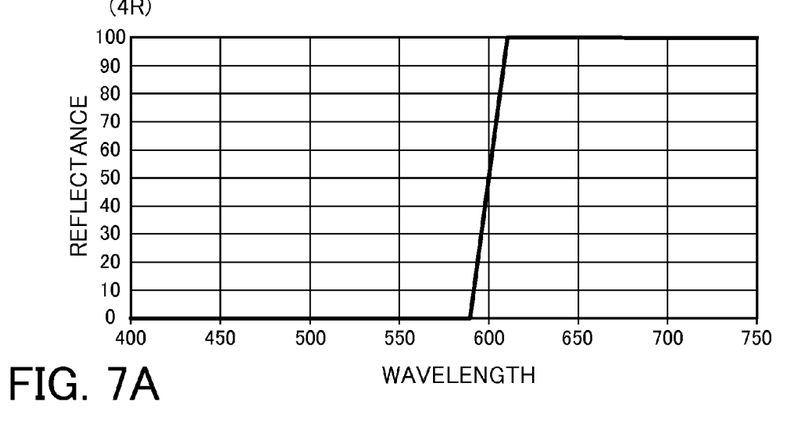
FIGS. 7A, 7B and 7C are graphs illustrating characteristics of a dichroic mirror used in a light source unit according to Embodiment 2 of the present invention.
Figure 7B:
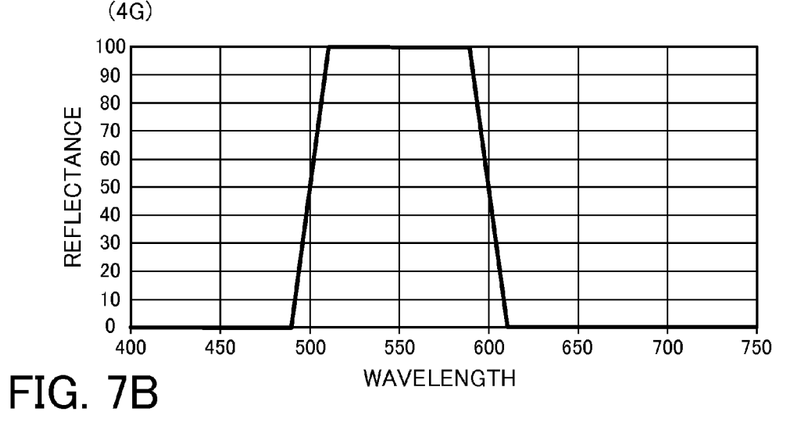
Figure 7C:
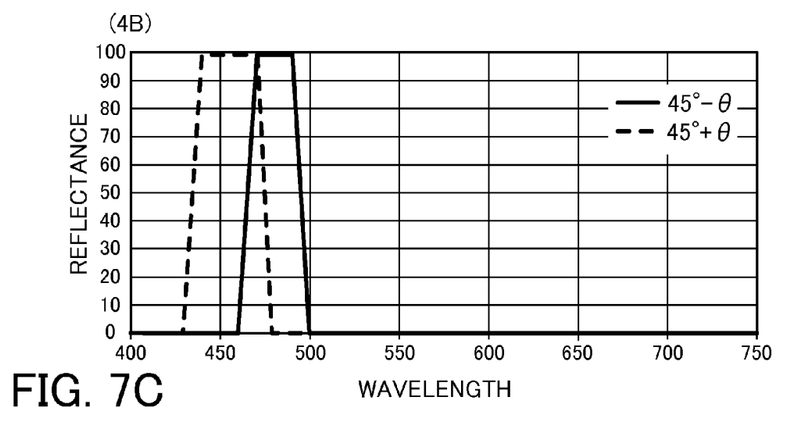

The dichroic mirror 4B has a characteristic illustrated in FIG. 7C. Specifically, the characteristic needs to be such that the dichroic mirror 4B almost completely transmits light having a wavelength of 448±10 nm at an incident angle of $45°-\theta$ and almost completely reflects light having a wavelength of 448±10 nm at an incident angle of $45°+\theta$. This characteristic, which shows a larger shift amount of the reflection band as compared to that in Embodiment 1, is obtainable through selection of a film material and a film structure or a larger incident angle difference $\theta$, for example. This embodiment requires fewer kinds of light sources than that in Embodiment 1, which facilitates electric control.

Embodiment 3

Figure 9:
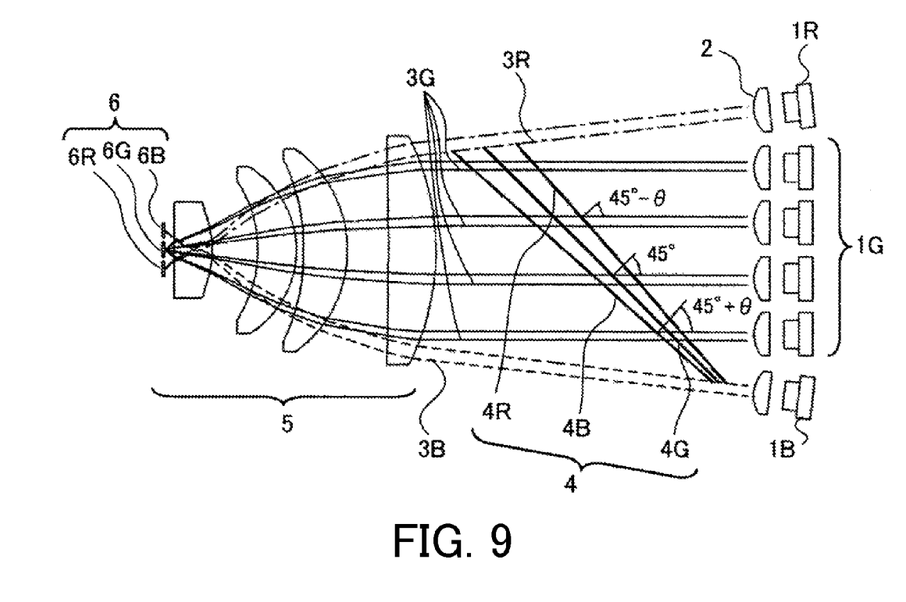
FIG. 9 is an optical path diagram of a light source unit according to Embodiment 3 of the present invention.

FIG. 9 is an optical path diagram of a light source unit according to Embodiment 3. This embodiment differs from Embodiments 1 and 2 in that the dichroic mirror 4 is differently arranged. This embodiment employs the same light source wavelength and the same optical spectrum of a parallel light reflected by a diffusion reflector as those in Embodiment 2.

The dichroic mirrors 4 of three kinds of 4R, 4G, and 4B according to this embodiment are arranged in order from a light source. The dichroic mirror 4G is arranged with its surface normal tilted at an angle of 45° to the parallel light flux 3G (the optical axis of the condenser lens system). The dichroic mirrors 4R and 4B are arranged at $\theta$ to the dichroic mirror 4G with their surface normal angles $45°-\theta$ and $45°+\theta$ respectively.

Figure 10A:
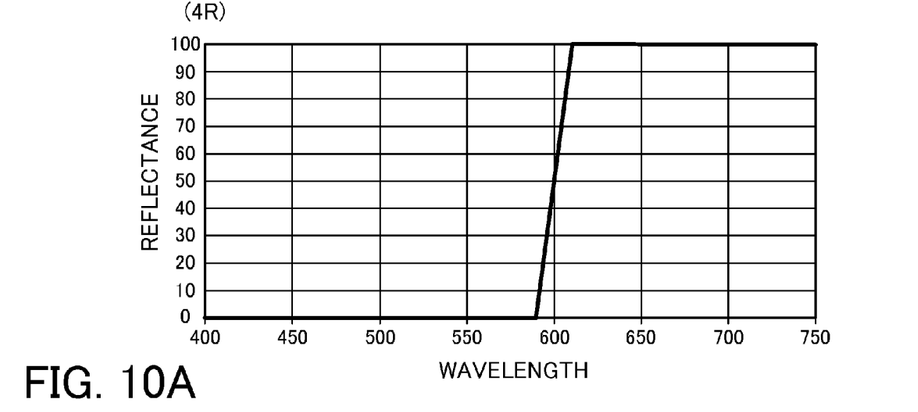
FIGS. 10A, 10B and 10C are graphs illustrating characteristics of a dichroic mirror used in the light source unit illustrated in FIG. 9.
Figure 10B:
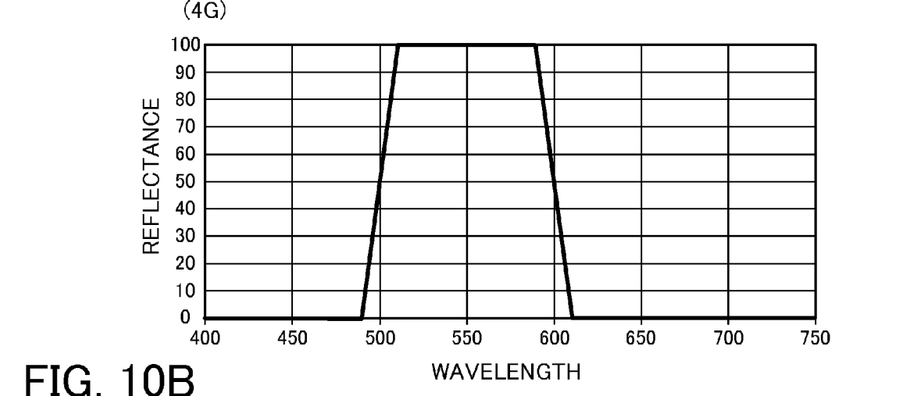
Figure 10C:
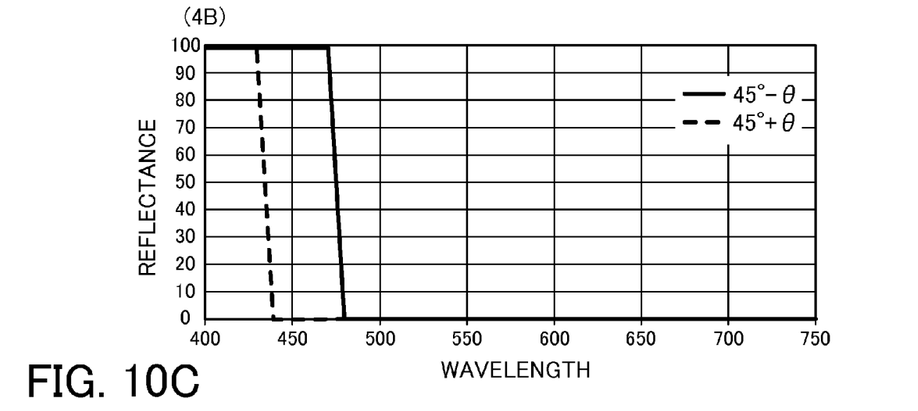

FIGS. 10A to 10C illustrate spectral reflection characteristics of the dichroic mirrors 4R, 4G, and 4B. The dichroic mirrors 4R and 4G has no reflection characteristics for the blue band and are designed such that their reflection characteristic do not significantly vary with incident angles. Thus, the dichroic mirrors 4R and 4G transmit the parallel light flux 3G of a wavelength of 448 nm without reflecting it. On the other hand, the dichroic mirror 4B is designed such that a reflection band shift increases with an incident angle. In this embodiment, the reflection characteristic of the dichroic mirror 4B is set such that the parallel light flux 3G (448 nm) passes through the dichroic mirror 4B when incident at $45°+\theta$ and is reflected by the dichroic mirror 4B when outwardly incident at $45°-\theta$.

Embodiment 4

Figure 12:
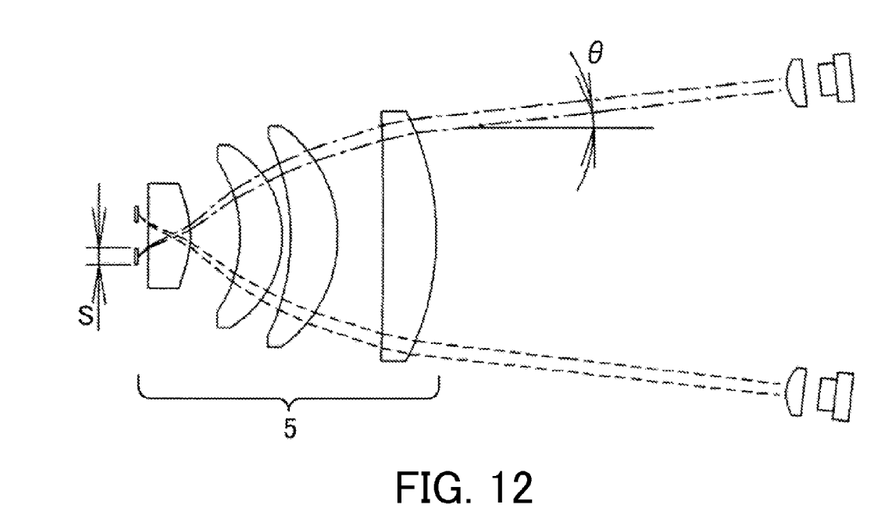
FIG. 12 is an optical path diagram of a condenser optical system according to Embodiment 4 of the present invention.

FIG. 12 is an optical path diagram of a light source unit according to Embodiment 4. In this embodiment, a light flux from a light source is incident on the condenser lens system 5 at angles different from each other. This embodiment differs from the embodiments described so far in that condensing positions are at a single fluorescent material. When the diameter of a condensation spot for each light source is denoted by S and the focal length of the condenser lens system 5 is denoted by f, an angle $\theta$ satisfying $f*\tan\theta>S$ is set as the angle of the light flux from the light source. This setting avoids overlapping between the condensation spots. The condensation spots overlap each other for the smaller angle $\theta$. The efficiency of the fluorescent material degrades at high temperature. To avoid the degradation and a burn, for example, a light density is required to be reduced as possible. The light flux of the light source is angled so as to satisfy this requirement, so that a reduced light density enables improvement of durability and the efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment employs a plurality of light sources 1 arranged in arrays, but may employ a single light source 1. Furthermore, a solid light source unit such as an LED may be used in place of a laser light source. The red and blue lights are laser source lights, but may be lights emitted from fluorescent bodies in the same manner as for the green light. The light source wavelength and the characteristics of the dichroic mirrors may be optionally changed. The number of light source images of diffusion reflectors is not limited to three. Although the dichroic mirrors are arranged at angles with respect to an angle of 45° to the condenser lens system, the angle of 45° may be a different angle.

Each of the embodiments provides a small and highly efficient light source unit and a projection type display apparatus including the same.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2013-219726, filed on Oct. 23, 2013, which is hereby incorporated by reference herein in its entirety.

What is claimed is:

1. A light source unit comprising:
    a first light source configured to emit a first light flux;
    a second light source configured to emit a second light flux;
    a condenser optical system including a plurality of condenser lenses having a common optical axis and configured to condense the first light flux from the condenser lenses to a first position and to condense the second light flux from the condenser lenses to a second position different from the first position,
    a first optical element arranged at the first position and configured to reflect the first light flux to the condenser optical system; and
    a second optical element arranged at the second position and configured to reflect the second light flux to the condenser optical system,
    wherein the condenser optical system is arranged such that the first light flux and the second light flux are incident on a condenser lens, among the condenser lenses that is disposed closest to the first light source and the second light source, at angles different from each other.

2. The light source unit according to claim 1, further comprising:
    a first light guide element configured to guide a light flux passing through the condenser optical system from the first optical element; and
    a second light guide element arranged at a position different from that of the first light guide element and configured to guide a light flux passing through the condenser optical system from the second optical element.

3. The light source unit according to claim 2, wherein the first light guide element and the second light guide element are dichroic mirrors having spectral reflection characteristics different from each other.

4. The light source unit according to claim 3, wherein a reflecting surface of the dichroic mirror as the first light guide element and a reflecting surface of the dichroic mirror as the second light guide element are arranged at angles different from each other.

5. The light source unit according to claim 3, wherein a reflection band of the dichroic mirror as the second light guide element varies with an incident angle of the second light flux on the second light guide element.

6. The light source unit according to claim 2, wherein one of the first optical element and the second optical element includes a fluorescent layer that fluoresces in response to incident light as excitation light, and the other includes a diffusion reflector.

7. The light source unit according to claim 2, wherein the first optical element is configured to change a wavelength band of the first light flux,
    wherein the first light flux is incident on the condenser optical system through the first light guide element,
    wherein the second optical element is configured to change an optical path of the second light flux, and
    wherein the second light flux is incident on the condenser optical system not through the second light guide element.

8. The light source unit according to claim 1, further comprising:
    an array of the first light sources; and
    an array of the second light sources,
    wherein the array of the first light sources and the array of the second light sources are arranged at angles different from each other relative to an optical axis of the condenser optical system.

9. The light source unit according to claim 1, wherein the first light flux and the second light flux have wavelength bands different from each other.

10. The light source unit according to claim 1, wherein the first light flux and the second light flux have equal wavelength bands.

11. The light source unit according to claim 2, further comprising:
    a third light source configured to emit a third light flux having a wavelength different from those of the first light flux and the second light flux;
    a third optical element arranged at a position different from the first position and the second position and configured to change at least one of a wavelength band and an optical path of the third light flux and to reflect the third light flux; and a third light guide element arranged at a position different from those of the first light guide element and the second light guide element and configured to guide a light flux passing through the condenser optical system from the third optical element.

12. The light source unit according to claim 11, wherein the third optical element is configured to change an optical path of the third light flux, and wherein the third light flux is incident on the condenser optical system not through the third light guide element.

13. A projection type display apparatus comprising a light source unit, wherein the light source unit includes:

a first light source configured to emit a first light flux;

a second light source configured to emit a second light flux;

a condenser optical system including a plurality of condenser lenses having a common optical axis and configured to condense the first light flux from the condenser lenses to a first position and to condense the second light flux from the condenser lenses to a second position different from the first position, a first optical element arranged at the first position and configured to reflect the first light flux to the condenser optical system; and a second optical element arranged at the second position and configured to reflect the second light flux to the condenser optical system, wherein the condenser optical system is arranged such that the first light flux and the second light flux are incident on a condenser lens, among the condenser lenses that is disposed closest to the first light source and the second light source, at angles different from each other.

14. The light source unit according to claim 1, wherein the first optical element is a first characteristic changing element configured to change at least one of a wavelength band and an optical path of the first light flux and to reflect the first light flux, and wherein the second optical element is a second characteristic changing element configured to change at least one of a wavelength band and an optical path of the second light flux and to reflect the second light flux.

15. The light source unit according to claim 1, wherein the first optical element and the second optical element are configured to diffusively reflect the first light flux and the second light flux, respectively.

* * * * *